(12) United States Patent
Huang

(10) Patent No.: US 6,615,115 B1
(45) Date of Patent: Sep. 2, 2003

(54) METHOD OF REDUCING SCANNING DISCONTINUITY

(75) Inventor: Yin-Chun Huang, Hsinchu (TW)

(73) Assignee: UMAX Data Systems, Inc., Hsinchu (TW)

(*) Notice: Subject to any disclaimer, the term of this patent is extended or adjusted under 35 U.S.C. 154(b) by 495 days.

(21) Appl. No.: 09/620,870

(22) Filed: Jul. 21, 2000

(30) Foreign Application Priority Data

Apr. 26, 2000 (TW) .......................... 89107841 A

(51) Int. Cl.⁷ .................. G05D 1/10; H04N 1/04
(52) U.S. Cl. .................. 700/302; 700/56; 358/412; 358/474
(58) Field of Search .................. 700/56, 57, 61–64, 700/66, 302, 304, 306; 702/33, 150; 359/197; 358/474, 413, 406, 412, 468, 486, 305; 250/234; 318/597, 612, 611, 56, 86

(56) References Cited

U.S. PATENT DOCUMENTS

| 4,733,308 A | * | 3/1988 | Nakamura et al. | ........... 358/412 |
| 4,752,891 A | * | 6/1988 | Van Daele et al. | ......... 358/474 |
| 5,164,845 A | * | 11/1992 | Takeuchi | .................... 358/474 |
| 5,239,387 A | * | 8/1993 | Stein et al. | .................. 358/444 |
| 5,369,504 A | * | 11/1994 | Walker | ........................ 358/437 |
| 5,932,985 A | * | 8/1999 | Hayashi | ...................... 318/560 |
| 5,970,181 A | * | 10/1999 | Ohtsu | ........................ 382/274 |
| 6,335,807 B1 | * | 1/2002 | Neale et al. | ................. 358/486 |
| 6,369,918 B1 | * | 4/2002 | Tom et al. | ................... 358/486 |

* cited by examiner

Primary Examiner—Leo Picard
Assistant Examiner—Paul Rodriguez
(74) Attorney, Agent, or Firm—J.C. Patents

(57) ABSTRACT

A control method for removing scanning discontinuity in scanners. The relationship between a driving motor and an elastic body such as a leather belt or a steel cable linked to the chassis inside a scanner is investigated so that time constants for achieving system stability are found. Through setting the time constants, the forwarding and reversing motion of the chassis is controlled so that scanning discontinuity due to stopping and restarting is reduced.

5 Claims, 3 Drawing Sheets

METHOD OF REDUCING SCANNING DISCONTINUITY

CROSS-REFERENCE TO RELATED APPLICATION

This application claims the priority benefit of Taiwan application serial no. 89107841, filed Apr. 26, 2000.

BACKGROUND OF THE INVENTION

1. Field of Invention

The present invention relates to a method of controlling a scanner. More particularly, the present invention relates to a method of controlling scanning discontinuity.

2. Description of Related Art

In the operation of a scanner, sometimes the scanning speed is faster than the data transmission rate to a host computer. To keep all the scanned data, a temporary storage area has to be allocated inside the scanner. This temporary storage area is known as a buffer. However, the rate of generation of data by a scanner is so fast that sometimes even the buffer is full. When the buffer is full, the scanner must stop scanning. Otherwise, some data are lost.

Conventionally, as soon as the buffer is full, the scanner will stop immediately. In other words, the chassis inside the scanner will stop. Scanning will resume only when the some of the data inside the buffer is emptied.

However, the chassis is moving forward and scanning at a constant speed before a request signal for stopping is sent to the driver of the chassis. After the chassis has stopped and a portion of the data in the buffer has transmitted, the scanner can resume scanning. Since the scanner is in a stationary state, the scanner needs to accelerate for awhile before picking up the normal scanning speed again. Consequently, the speed of movement of the chassis during this transition period is quite different from a normal scanning. In other words, there is a discontinuity in the middle of a scanning operation leading to a possible discontinuity in the scanned image.

In lower grade scanners, this type of problems are usually ignored leading to a break in the scanned image or discontinuity. However, in some higher-grade scanners, the chassis is allowed to move backward for a short distance before accelerating forward so that inertial effect of stopping and starting and other mechanical errors of the chassis itself are removed. In this type of scanners, when the chassis reaches the former stopping position, the chassis is already moving at the normal scanning speed. Hence, discontinuity of scanned image due to stopping is compensated. To deal with the problem, a conventional method relies on the arrangement proper timing of the chassis driver. Assume that a period $t_1$ is required for the chassis to halt from a normal scanning speed. Moving backward for the chassis to halt from the normal scanning speed also requires the period of $t_1$. Because of accelerating the chassis from a stop status to a status of the normal scanning speed in a forward or backward direction requires the same time periods, assuming that accelerating times are of the same for both directions, the accelerating times for both directions are also $t_1$. In brief, total time spent to stop and restart a scanning operation is about $4t_1$, which comprising the time periods of decelerating from a constant forward speed to stop, moving backward to a constant backward speed, decelerating from the constant backward speed to stop, and accelerating forward to the constant speed.

The aforementioned description of the chassis is looked upon from a perspective of operational timing. From a mechanistic point of view, forces on the chassis and related components can be indicated by graphs shown in FIGS. 1A and 1B. FIG. 1A is a graph showing the variation of motor traction versus time for a conventional scanner in the process of stopping and restarting. FIG. 1B is a graph showing the variation of body extension versus time for a conventional scanner in the process of stopping and restarting. At time t=0, the forward-moving force provided by a motor is changed to an identical force in the opposite direction. After a period of $2t_1$, the amount of extension of the elastic body reaches a stable value. At this point, the chassis has retracted to a suitable position. The motor then provides a forward-moving force again. After another period of $2t_1$, the amount of body extension reaches a stable value. At this point, the chassis has reached a specified speed for scanning. In other words, the chassis returns to the former point where a signal for stopping has been issued at a constant forward speed. Consequently, scanning operation can be resumed without any image distortion or discontinuity.

However, each starting and stopping of the chassis requires a total delay of $4t_1$. Hence, scanning performance is greatly lowered.

SUMMARY OF THE INVENTION

Accordingly, one object of the present invention is to provide a controlling method capable of reducing scanning discontinuity in scanners. Since this invention targets the reason of discontinuity of scanning and controls the movement of the chassis, both scanning speed and efficiency of a scanner are improved.

To achieve these and other advantages and in accordance with the purpose of the invention, as embodied and broadly described herein, the invention provides a method for reducing scanning discontinuity. The method can be applied to control the movement of the chassis inside a scanner. During a reckoning period, a retracting force is applied to the chassis. At the end of the reckoning period, a forwarding force is applied to the chassis during a reversing period. At the end of the reverse period, no forces are applied within a stopping period. Finally, a forwarding force is applied to the chassis within another reckoning period.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
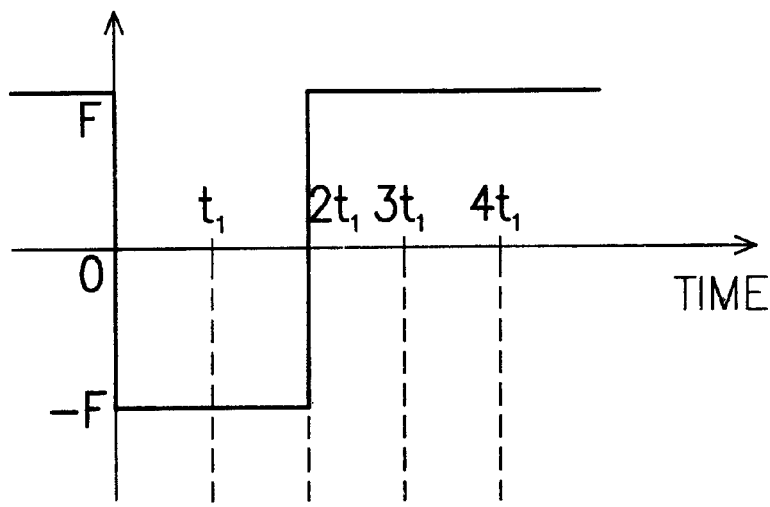
FIG. 1A is a graph showing the variation of motor traction versus time for a conventional scanner in the process of stopping and restarting.
Figure 1B:
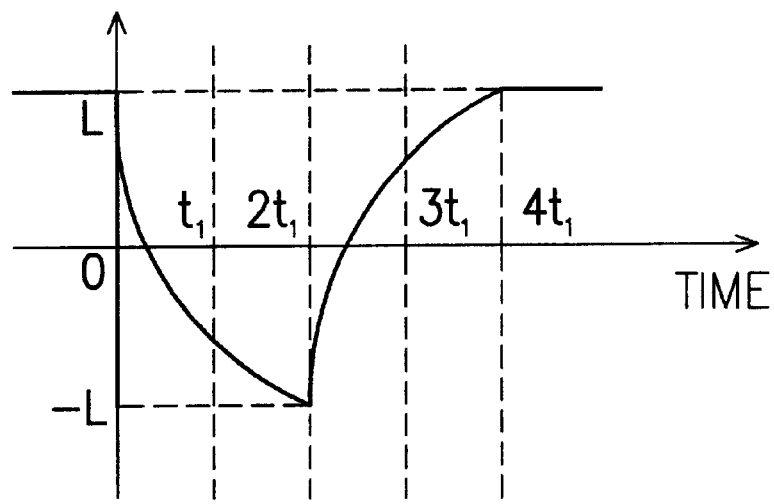
FIG. 1B is a graph showing the variation of body extension versus time for a conventional scanner in the process of stopping and restarting.

Reference will now be made in detail to the present preferred embodiments of the invention, examples of which are illustrated in the accompanying drawings. Wherever possible, the same reference numbers are used in the drawings and the description to refer to the same or like parts.

Figure 2:
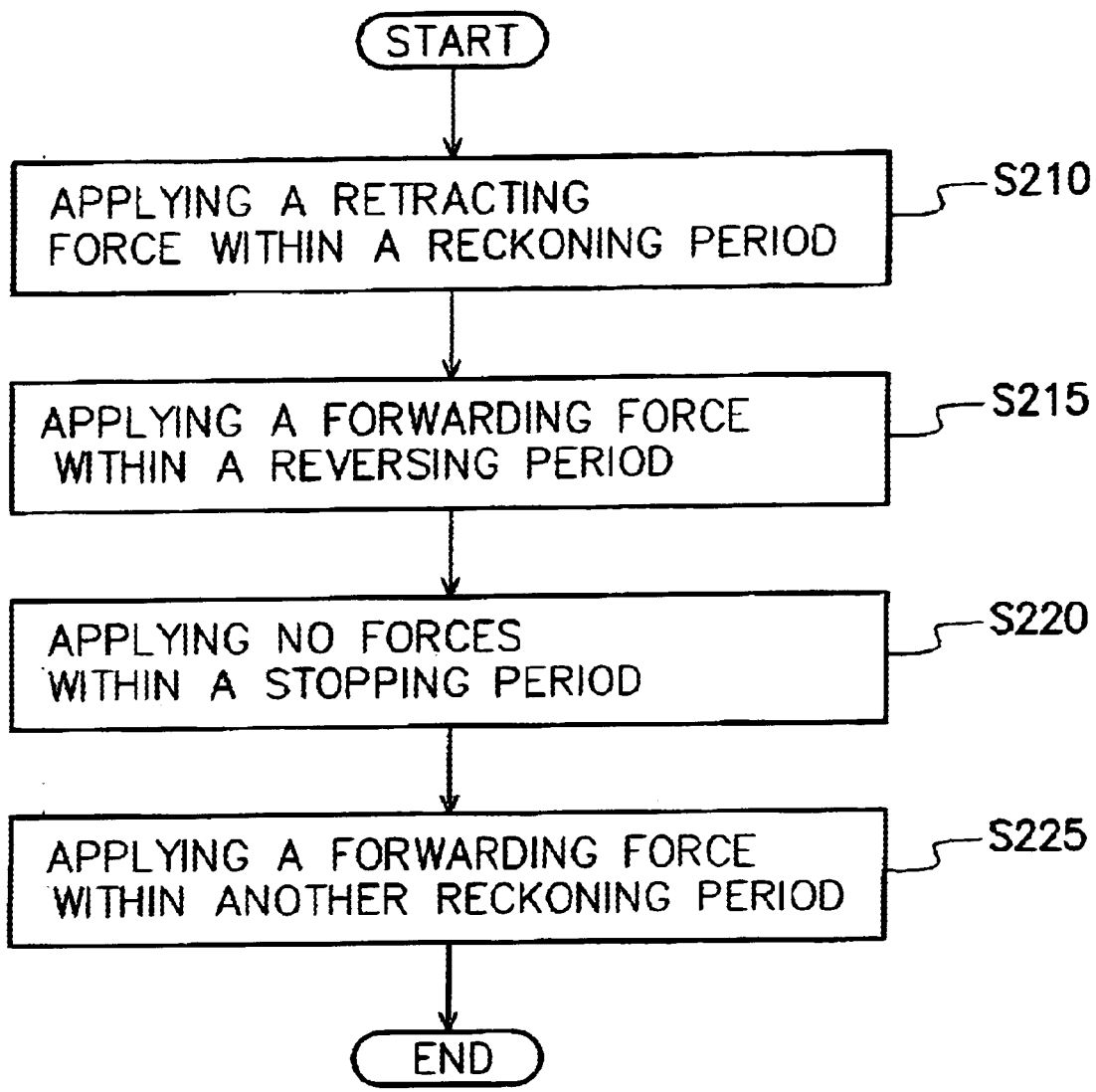
FIG. 2 is a flow chart showing the control steps for reducing scanning discontinuity according to one preferred embodiment of this invention.

FIG. 2 is a flow chart showing the control steps for reducing scanning discontinuity according to one preferred embodiment of this invention. In this embodiment, a retracting force is applied to an elastic body attached to a chassis during a reckoning period as in step S210. The elastic body can be a leather belt or a steel cable, for example. In addition, the reckoning period is determined by the time needed between the first application of a force to and the extension of the elastic body to a fix length.

Figure 3A:
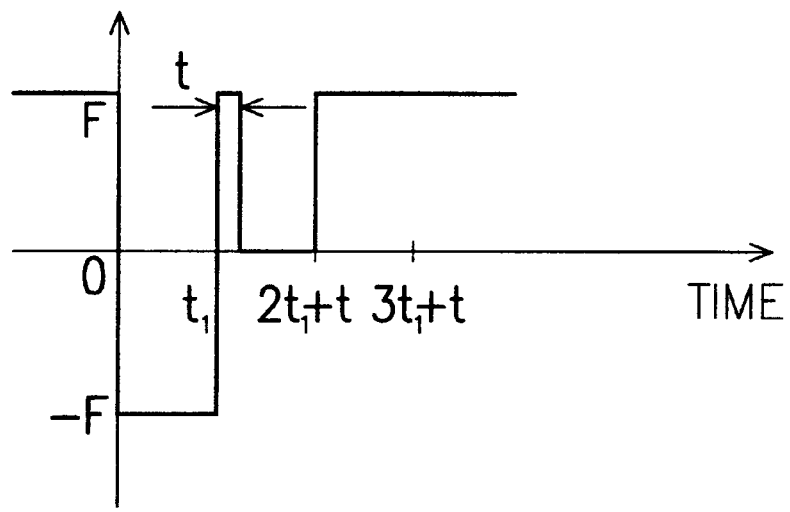
FIG. 3A is a graph showing the variation of motor traction versus time for a scanner in the process of stopping and restarting according to this invention.
Figure 3B:
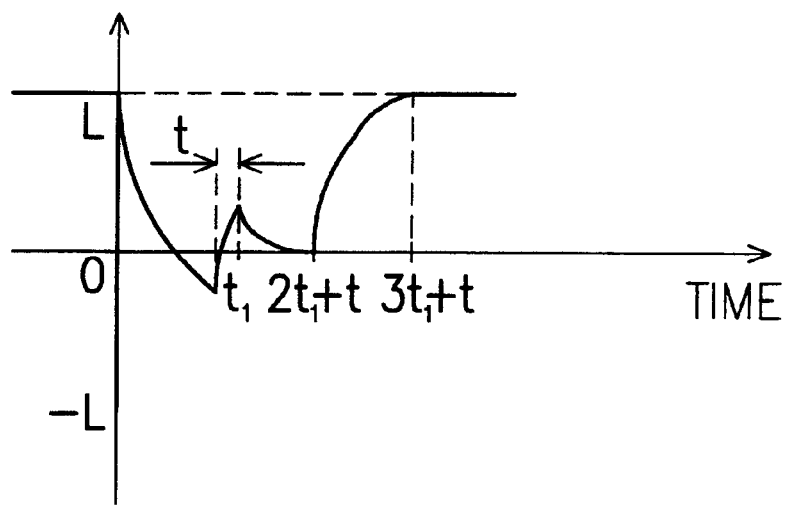
FIG. 3B is a graph showing the variation of body extension versus time for a scanner in the process of stopping and restarting according to this invention.

FIG. 3A is a graph showing the variation of motor traction versus time for a scanner in the process of stopping and restarting according to this invention. FIG. 3B is a graph showing the variation of body extension versus time for a scanner in the process of stopping and restarting according to this invention. As shown in FIG. 3A, before starting to measure the time (in the negative portion of the time axis), a forwarding force is applied by a traction motor on the chassis (force F in FIG. 3A). At this point, the elastic body has a fixed extension. In step S210, a retracting force (−F in FIG. 3A) is applied to the chassis. After the elastic body is subjected to the retracting force for a reckoning period $t_1$, the forwarding motion is ground to a halt. Since the chassis is still in an accelerating state, the extension of the elastic body will not stop at zero extension. Instead, there will be a little reverse extension.

After the expiration of the reckoning period $t_1$, a forwarding force is applied to the elastic body during a reverse period in step S215. This reverse period is shown as t in FIGS. 3A and 3B. Due to the forwarding force, the elastic body begins to extend (as shown in FIG. 3B). Since as long as the tension produced by the elastic body changes from a backward to a forward direction, that means the extension of the elastic body reverts from negative to positive, only a small value of t is required. Compared with the reckoning period, the length of this period t is almost negligible.

In step S220, no forces are applied to the elastic body during a stopping period. Since this stopping period is inserted to allow the elastic body returning to a zero extension, length of the stopping period can be adjusted according to actual requirements. In general, more time is saved when the reverse period is shortened. In addition, a shorter reverse period can lead to a smaller extension in the elastic body. Consequently, time required in the stopping period is also reduced. In the worst case scenario, length of the stopping time is equal to the reckoning time.

At the end of the stopping period, a forwarding force is applied to the elastic body anew in step S225. This forwarding force is applied for another reckoning period so that the desired extension for the elastic body is obtained. That is, the chassis of the scanner has now reached the standard scanning speed.

In summary, four reckoning periods 4t, are required in a conventional scanning control method. In this invention, stopping and restarting of the chassis requires only three reckoning periods plus a small reversing period even in the worst case. In other words, the overall time for stopping and restarting the chassis is just $3t_1+t$. Therefore, reduction of the reversing period is able to increase scanning speed even more.

In general, this invention has several advantages. Utilizing the variation mode of an elastic body, time necessary for reducing scanning discontinuity is shortened. Hence, efficiency and scanning speed of existing scanners will improve.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control method for removing scanning discontinuity in a scanner having a chassis therein, comprising the steps of:

applying a retracting force to the chassis within a first reckoning period;

applying a forwarding force to the chassis within a reversing period after the first reckoning period;

applying no forces to the chassis within a stopping period after the reversing period;

applying a forwarding force to the chassis within a second reckoning period after the stopping period.

2. The control method of claim 1, wherein the first and the second reckoning periods are respectively the time required for driving an elastic body into a stable state using a motor in the scanner, wherein the elastic body is attached to the chassis and the motor is driving the elastic body.

3. The control method of claim 2, wherein the elastic body includes a leather belt.

4. The control method of claim 2, wherein the elastic body includes a steel cable.

5. The control method of claim 1, wherein the stopping period is at most equal to the first reckoning period.

* * * * *